(12) United States Patent
Hathaway

(10) Patent No.: US 6,672,788 B2
(45) Date of Patent: Jan. 6, 2004

(54) BALL JOINT WITH DETENT ACTION

(76) Inventor: Clarence Eduard Hathaway, 4800 Bentcreek Dr., Fuquay-Varina, NC (US) 27526

(*) Notice: Subject to any disclaimer, the term of this patent is extended or adjusted under 35 U.S.C. 154(b) by 0 days.

(21) Appl. No.: 10/066,980

(22) Filed: Feb. 4, 2002

(65) Prior Publication Data

US 2003/0147688 A1 Aug. 7, 2003

(51) Int. Cl.$^7$ ................................................ F16M 3/00
(52) U.S. Cl. ........................ 403/90; 403/132; 403/144
(58) Field of Search .................. 403/90, 132, 138, 403/144, 56, 140

(56) References Cited

U.S. PATENT DOCUMENTS

| | | | | |
|---|---|---|---|---|
| 255,103 A | * | 3/1882 | Deschamp | 464/140 X |
| 1,186,428 A | * | 6/1916 | Newman | 403/56 X |
| 1,279,803 A | * | 9/1918 | Watson | 248/160 |
| 6,352,227 B1 | * | 3/2002 | Hathaway | 403/144 X |

* cited by examiner

Primary Examiner—John R. Cottingham

(57) ABSTRACT

A ball and socket joint incorporating a detent mechanism that provides positive biasing toward a desired position. The ball and socket joint can be used in flexible supports that hold and support items such as lamps, tools and faucets. The detent mechanism comprises two corresponding parts, one in the ball portion and the second in the socket portion of the joint. The first detent part is a protrusion of some type and the second detent part is a groove or indentation that is adapted to accept and engage the protrusion. If the ball contains the detent protrusion, then the socket contains the detent indentation. And conversely, if the socket contains the detent protrusion, then the ball contains the detent indentation. The detent tensioning force can be provided by a spring, a spring band, the characteristics of the material from which the joint is made, or by some other similar tensioning device.

13 Claims, 5 Drawing Sheets

BALL JOINT WITH DETENT ACTION

BACKGROUND OF THE INVENTION

The present invention relates generally to the field of flexible support stands and more particularly to flexible ball joint supports that incorporate a detent mechanism in the ball joint.

Flexible support stands or posts are typically used for supporting items such as lamps, tools, microphones, cameras and faucets, just to name a few. In the past, flexible supports have been limited in length due to the weight of the item being supported and the weight of the support itself causing the joints of the support to lose the position in which they were set. Such loss of joint positioning results in drooping of the support and of the item supported. Another fault in previous flexible supports is the inability of the support to be biased to a desired position, or to be easily returned to a straight in-line position where all segments in the flexible support form a straight line. The present invention provides various embodiments of multi-segmented flexible supports that overcome these deficiencies.

A ball joint is a special type of joint comprising a ball that is held by, and rotates within, a socket. Ball joints provide a wide range of flexibility and allow the joint to bend in a full circle of different directions. Flexible supports for lamps or other lightweight tools have typically been constructed of either a semi-rigid shaft that allows for bending and positioning of the supported item, or of a series of variously styled joints that result in effective flexibility of a series of rigid segments. Early inventors made use of swiveled ball joints to achieve a universal range of lamp or tool positioning. U.S. Pat. No. 1,186,428 to Newman (1916) describes a lamp bracket that uses a series of ball and socket joints to provide flexible positioning of a lamp. The lamp support of Newman does not provide for biasing the joints in any one position, and requires external routing of the power cord; however, this idea does effectively illustrate the basic approach built upon by a number of similar, subsequent ideas.

In U.S. Pat. No. 936,379 to Stevens (1909), the approach to routing the lamp's power cord through the center axis of the flexible support is disclosed. In this idea, a "ball" and "thimble" bracket arrangement allows for the flexibility of the support. An additional useful aspect of this idea is the use of a tension spring, which runs along the length of the support's hollow interior and keeps the system stiff, yet still flexible. However, the overall useful length of this device is limited by the useful tension that the spring can provide, when the weights of the supported lamp and the support's own weight are taken into account.

U.S. Pat. No. 1,279,803 to Watson (1918) describes a similar axial spring-tensioned support. This device uses ball and cone-shaped segments of gradually decreasing size with proximity to the lamp end of the support. The decreasing size, and therefore decreasing weight, of the support's segments allow for greater useful length, however the support length is still limited in part by the balance between the tensioning spring's joint stiffening effect and the loading imposed by the supported lamp.

More recent approaches to flexible tool or lamp supports make use of conjoined multiple ball and socket segments. U.S. Pat. No. 5,398,176 to Ahuja (1995) and U.S. Pat. No. 5,521,803 to Eckert, et al. (1996) both use ball and socket joints that rely on a friction fit to maintain joint stability. As with previous similar devices, the overall useful length of the support is limited due to reliance solely on this friction fit of the joint. Also, none of the other devices referenced have a means to bias the device to a desired position, or to quickly and easily return the support to a true axially straight alignment following use.

Detent mechanisms such as those found in car doors and kitchen cabinets are used to hold the doors open at a desired angle. Some force is required to engage and disengage the detent mechanism. Usually two parts are required in a detent device. A first protruding part is pushed into a second receiving part thereby holding, or biasing, the mechanism in that position. Typically a spring or other tensioning device is included in the detent mechanism to provide the pushing force.

SUMMARY OF THE INVENTION

A flexible multi-jointed support for holding items, such as lamps and tools, is provided. The support comprises multiple segments that are joined end to end, a joint being formed at each joining of two segments. At least one of the joints is a ball and socket joint that is capable of being biased in a desired orientation. The ball and socket joint comprises a male portion that is in the shape of a ball, wherein the ball has a detent area covering a circumference of the ball, and a female portion that is in the shape of a socket that frictionally embraces the ball. The socket has a detent area that aligns with, and engages with, the detent area of the ball when the male and female portions are placed in a desired position, thereby biasing the joint toward that position.

In an exemplary embodiment, the detent area of the ball comprises an indentation that extends around a circumference of the ball, and the detent area of the socket comprises a protrusion toward the ball that extends around an internal circumference of the socket. The protrusion of the socket is adapted to engage the indentation in the ball when the ball and socket are aligned in a desired position.

In another embodiment, the detent area of the ball comprises an outward protrusion that extends around a circumference of the ball, and the detent area of the socket comprises an indentation that extends around an internal circumference of the socket. The indentation of the socket is adapted to engage the outward protrusion of the ball when the ball and socket are aligned in a desired position.

In a third embodiment, the detent area of the ball comprises a spring band and one or more ball bearings aligned around the outside of the spring band, wherein the spring band is inside a circumference of the ball and provides an outward force on the ball bearings. The detent area of the socket comprises an indentation that extends around an internal circumference of the socket, and the indentation is adapted to engage the ball bearings, housed in the ball, when the ball and socket are aligned in a desired position.

In a fourth exemplary embodiment, the detent area of the ball comprises an indentation that extends around a circumference of the ball, and the detent area of the socket comprises a spring band that extends around an external circumference of the socket and provides an inward force on one or more ball bearings aligned along an interior of the spring band. The ball bearings of the socket are adapted to engage the indentation in the ball when the ball and socket are aligned in a desired position.

In other embodiments, the ball can have more than one detent area, wherein each detent area covers a different point or circumference area on the ball, and the socket can have more than one detent area. In such embodiments, every detent area on the socket can engage at least one detent area on the ball, and every detent area on the ball can engage at least one detent area on the socket, thereby allowing the support to be biased in more than one position

BRIEF DESCRIPTION OF THE DRAWINGS

The invention of the present application will now be described in more detail with reference to the accompanying drawings, given only by way of example, in which.

DETAILED DESCRIPTION OF THE INVENTION

Definitions of some terms that are used in this disclosure will be provided first. A "detent" is a device for positioning and holding one mechanical part in relation to another, so that the device can be released by force applied to one of the parts. "Detent device" and "detent mechanism" refer to all of the parts in the detent arrangement. "Axially straight alignment" refers to two segments being aligned end to end so that the two segments form a straight line. "Axial end" of a ball refers to the point on the ball through which a straight line running along the center of the length of the segment would pass. The axial end may also be described as the point on a ball of a segment that is furthest away from the middle of the segment. "Equator" is used to describe the circular area or band centrally located around a ball or socket.

Figures 1A, 1B:
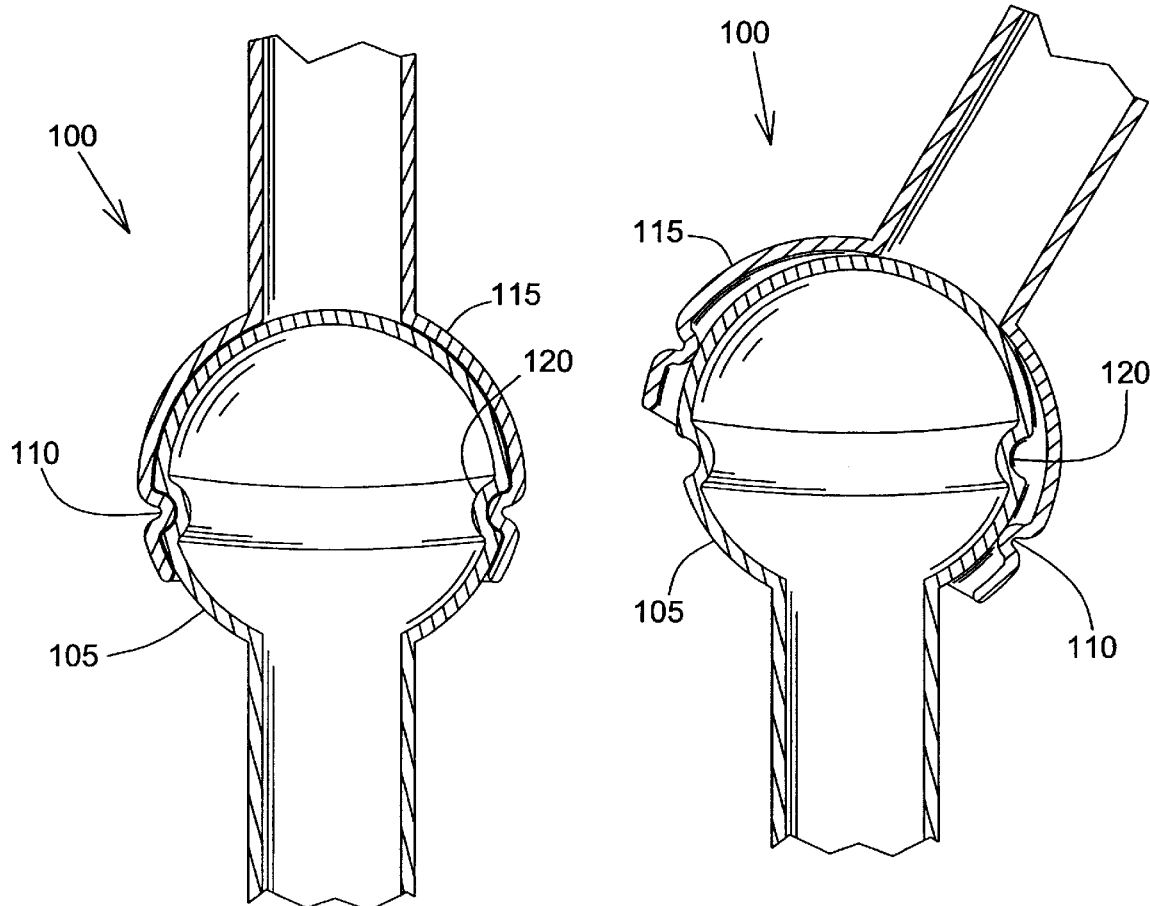
FIG. 1A illustrates an exemplary embodiment of the present ball and socket joint.
FIG. 1B illustrates a different orientation of the ball and socket of FIG. 1A.

FIG. 1A shows a cutaway view of an exemplary hollow ball joint assembly 100. In this example, the ball joint is made of a rigid material such as aluminum or plastic; however, other materials may also be used. An inwardly projecting detent ridge 110 is formed into the perimeter of the joint's socket 115, near the socket's equator. A corresponding circumferential groove 120 is formed into the joint's ball 105. The spring loading of this detent arrangement depends on the inherent springiness of the material from which the joint is made. FIG. 1A shows the joint 100 in an axially straight alignment. In this example, as the joint is flexed, the detent ridge 110 tends to resist being rotated out of its corresponding groove 120, thereby biasing the joint toward an axially straight alignment. FIG. 1B shows the joint 100 in a flexed alignment. Conversely to the position shown in FIG. 1A, the flexed joint 100 will tend to snap back to an axially straight alignment as the joint is straightened and the detent ridge 110 approaches the edge of its corresponding groove 120.

Figures 2A, 2B:
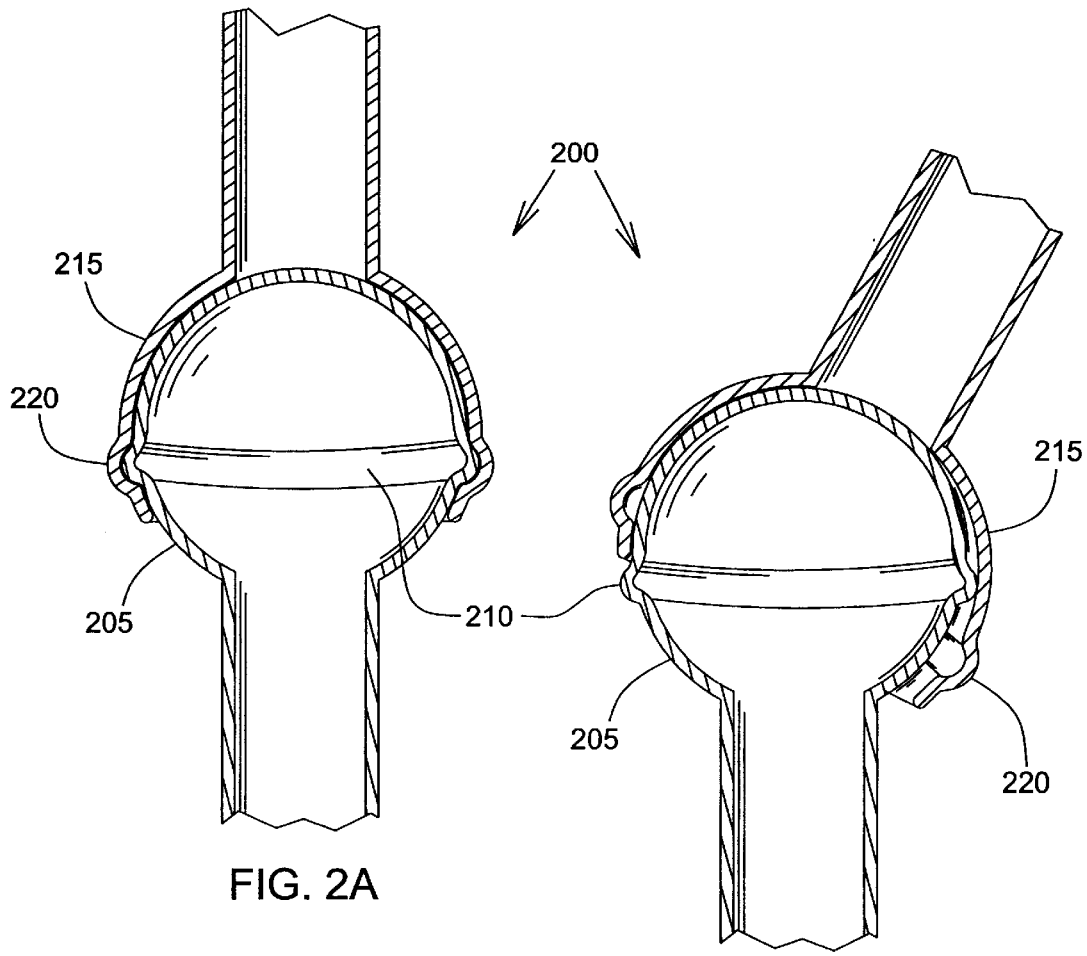
FIG. 2A illustrates another exemplary embodiment of the present ball and socket joint.
FIG. 2B illustrates a different orientation of the ball and socket of FIG. 2A.

FIG. 2A shows a cutaway view of another exemplary hollow joint assembly 200. In this embodiment, the joint's detent ridge 210 is formed into the joint's ball 205, and the corresponding groove 220 is formed into the joint's socket 215. FIG. 2A shows the joint in an axially straight alignment. As in FIG. 1A, the detent ridge 210 tends to resist being rotated out of its corresponding groove 220, thereby biasing the joint 200 toward an axially straight alignment. FIG. 2B shows the joint 200 in a flexed alignment, and as in FIG. 1B, the flexed joint will tend to snap back to an axially straight alignment as the joint 200 is straightened and the detent ridge 210 approaches the edge of its corresponding groove 220.

Figures 3A, 3B:
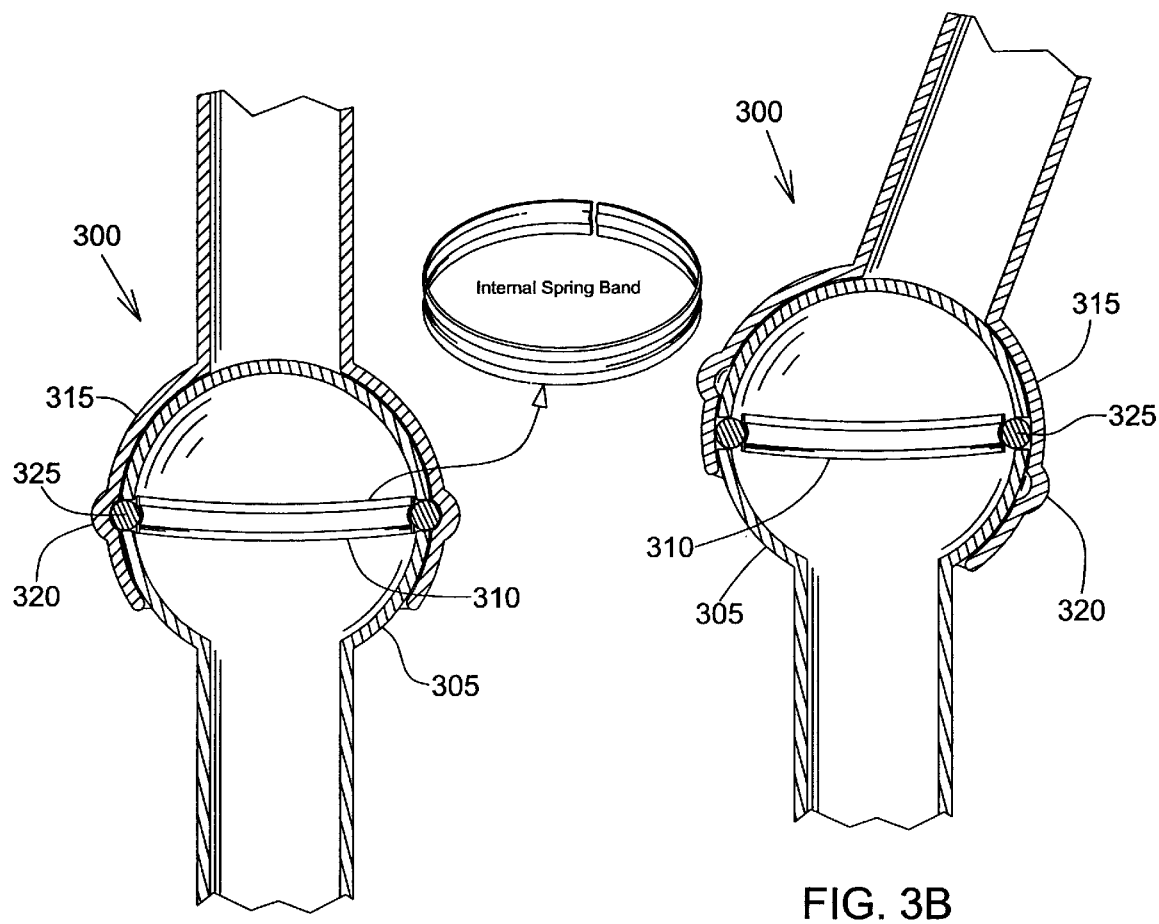
FIG. 3A illustrates a third exemplary embodiment of the present ball and socket joint.
FIG. 3B illustrates a different orientation of the ball and socket of FIG. 3A.

FIG. 3A shows a cutaway view of a third exemplary embodiment of a hollow ball joint assembly 300. In this embodiment, a spring-loaded detent comprising spring band 310 and detent balls 325 is used rather than a detent ridge. The detent balls 325 may be made from steel balls such as ball bearings, but may also be made from any other appropriately hard material. The detent balls 325 are spaced an equal distance apart around the circumference of the joint balls 305 equator, and are loosely retained in holes through the surface of the ball 305. Internal spring band 310 provides the radially outward spring-loading force to the detent balls 325. A detent groove 320 formed in the corresponding socket's 315 circumference, serves as a valley into which the detent balls 325 engage. FIG. 3A shows the joint 300 in an axially straight alignment. In this example, the detent balls 325 while engaged in their associated detent groove 320 create a tendency of the joint to resist angular deflection, thereby biasing the joint toward an axially straight alignment. Conversely, the flexed joint 300 shown in FIG. 3B will tend to snap back to an axially straight alignment as the joint 300 is straightened and the detent balls 325 approach the edge of their associated detent groove 320.

Figures 4A, 4B:
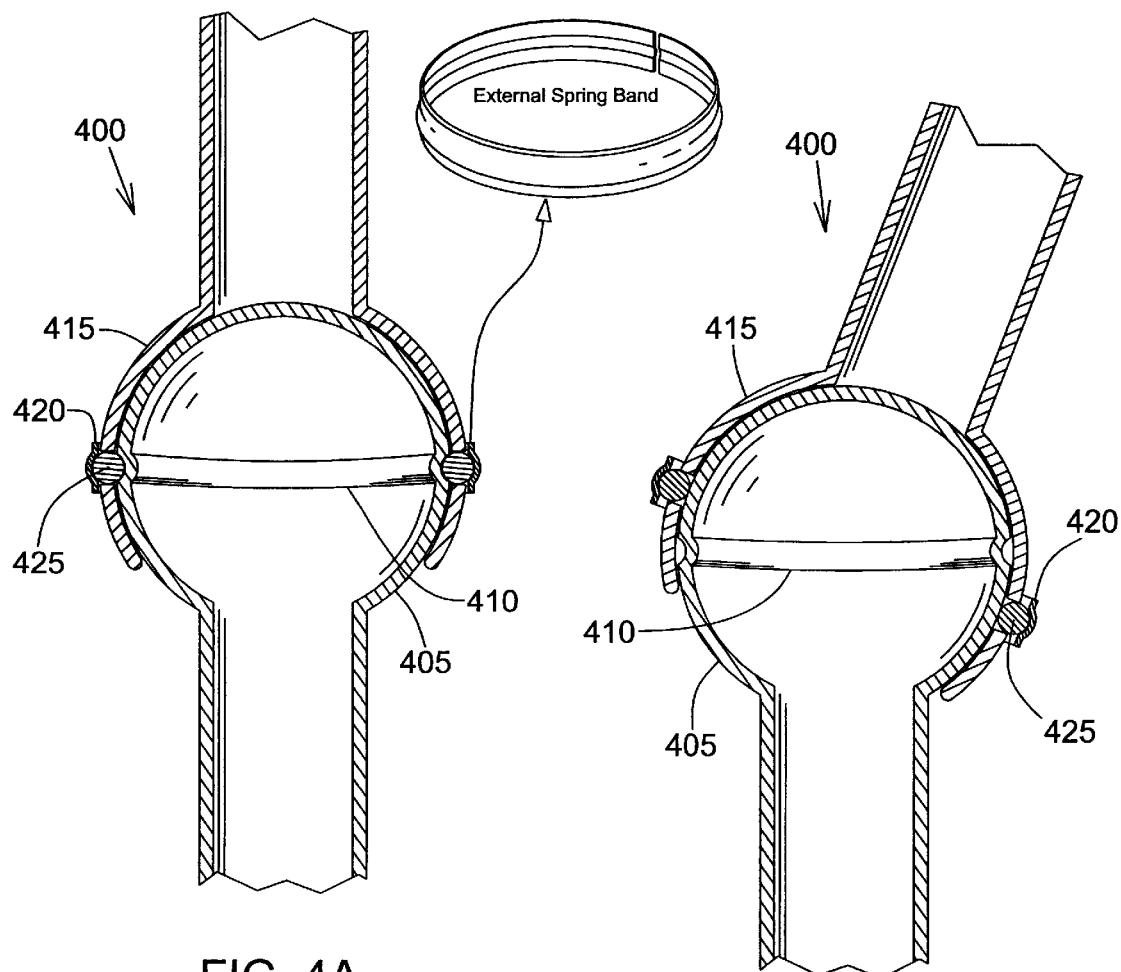
FIG. 4A illustrates a fourth exemplary embodiment of the present ball and socket joint.
FIG. 4B illustrates a different orientation of the ball and socket of FIG. 4A; and, FIG. 5 illustrates a support with multiple segments being used to form multiple joints.

FIG. 4A shows a cutaway view of another exemplary embodiment of a hollow ball joint assembly 400. In this embodiment, the spring-loaded detent balls 425 are spaced an equal distance apart around the circumference of the joint socket's 415 equator, and are loosely retained in holes through the surface of the socket 415. An external spring band 420 provides the radially inward spring-loading force to the detent balls 425. A detent groove 410 is formed in the joint's corresponding ball 405. The groove 410 is adapted to accept and engage detent balls 425. FIG. 4A shows the joint 400 in an axially straight alignment, wherein the detent balls 425 are engaged in the associated detent groove 410. In this position a tendency is created for the joint to resist angular deflection, thereby biasing the joint toward an axially straight alignment. Conversely, the flexed joint 400 shown in FIG. 4B will tend to snap back to an axially straight alignment as the joint 400 is straightened and the detent balls 425 approach the edge of their associated detent groove 410.

Figure 5:
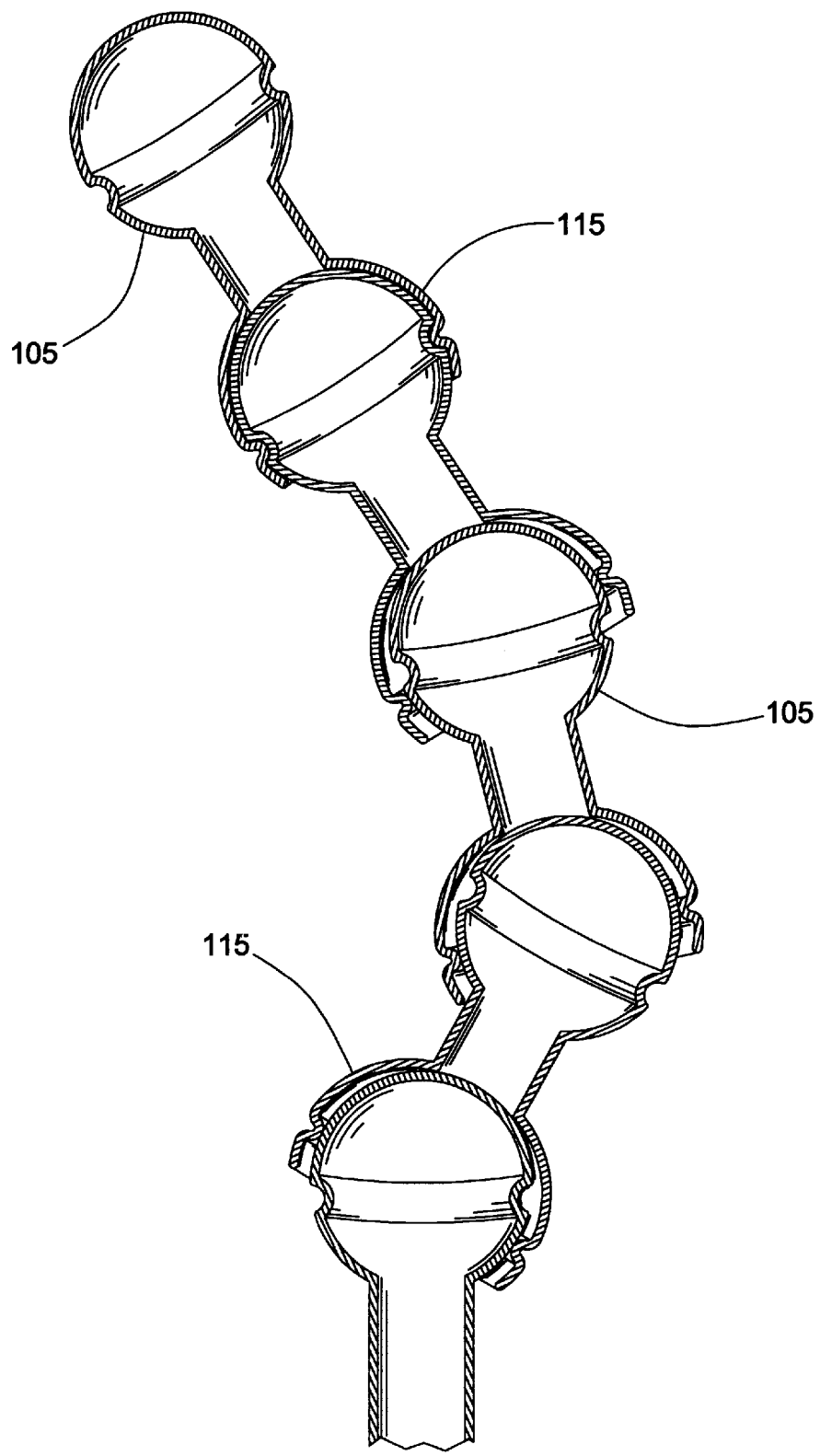

FIG. 5 illustrates the use of multiple segments to produce multiple ball and socket joints. Each segment has ball 105 as one of its ends and a socket 115 as its opposite end. When the ends of multiple segments are aligned they can be combined to form a multi-jointed support, as illustrated in FIG. 5.

In each of the above exemplary embodiments, the ball can be provided with a hole in its axial end to facilitate the passage of a cord, such as a power cord, through the interior of the support.

The above embodiments are intended to be exemplary and not limiting. The novel idea embodied in this disclosure is the merging of a detent mechanism with ball and socket joints. The figures discussed above are examples of different approaches to merging detent mechanisms with ball joints.

It will be appreciated by one of skill in the art that the detent balls do not have to be completely spherical, nor do the detent ridges need to be smoothly convex. In general, any sloped or rounded surface that can engage with a detent groove or depression will provide the necessary detent action. Alternative detent shapes include, but are not limited to: a bullet-shaped detent plunger, in which the rounded nose of the bullet acts against the detent depression; a cone-shaped detent, in which the tapered tip of the cone serves as the protrusion that engages the detent groove; and, a prism-shaped detent ridge in which the tapered tip of the detent ridge engages the detent groove.

Further, detent grooves are not limited to being smoothly concave valleys. A detent groove may be any sloped depression, including a "v" shaped groove, that suits the needed characteristics of the ball joint. In other alternative embodiments, the point of engagement for the detent mechanism might simply be a single hole or depression, or series of holes or depressions, that a detent protrusion can engage to provide the detent action. The shape of the detent mechanism is limited only by the desired characteristics of the ball joint. A series of detents can also be used for a given ball joint. The number of detents is limited only by the diameter of the ball joint, as well as the diameter and type of the individual detents. A joint having only one detent might serve some useful purpose, however a greater number of detents distributed around the joint would provide greater balance to the action of the joint.

The detent mechanism does not need to be located at or near the equator of the joint's ball for the detent to work. Some possible uses of the joint may specify locating the detent mechanism at a different position in relation to the equator. The detents and their corresponding points of engagement do not have to be on the same plane in relation to the ball's longitudinal axis. Positioning the detent on a different plane than its corresponding groove or depression would produce the effect of biasing the joint to an angular deflection other than that of being axially straight. This may be a desired alignment for some possible uses of the joint. Multiple sets of detents in a single ball joint may be used to provide a bias to several different points of angular deflection of the joint. Regardless of the shape of the detent device, any standard or obvious spring system may accomplish the spring loading of the detent device. These might include, but are not limited to: inwardly contracting or outwardly expanding spring rings or bands; standard coiled compression or extension springs; the inherent springiness of the material used for the construction of the ball joint itself; and flat spring plates attached to individual detents.

Also the detent device can be designed to be manually engaged or released. In other words, the detent plunger might need to be manually depressed back against its spring-loading to allow release from its groove or depression. Any of the above types of detent design could be applied to a ball joint, and are intended to be included in the scope of this disclosure.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

I claim:

1. A flexible multi-jointed support for holding items, including lamps and tools, wherein the support is comprised of multiple segments that are joined end to end each joining of two segments thereby forming the joints, and at least one of the joints is a ball and socket joint that is capable of being biased in a desired orientation, wherein each ball and socket joint comprises:
   a male portion, that is in the shape of a ball, wherein the ball comprises a detent area that includes one part of a detent mechanism; and,
   a spring biasing female portion, that is in the shape of a socket that frictionally embraces the ball, wherein the socket comprises a detent area that includes a second complimentary part of the detent mechanism that aligns with and engages the detent area of the ball when the male and female portions are placed in a desired position thereby biasing the joint toward that position.

2. The support of claim 1, wherein the ball has one or more detent areas and each detent area covers a different area on the ball; and,
   the socket has one or more detent areas, wherein every detent area on the socket can engage at least one detent area on the ball, and every detent area on the ball can engage at least one detent area on the socket, thereby allowing the support to be biased in one or more different positions.

3. The support of claim 1, wherein the detent area of the ball comprises an indentation that extends around a circumference of the ball; and,
   the detent area of the socket comprises a protrusion toward the ball that extends around an internal circumference of the socket and is adapted to engage the indentation in the ball when the ball and socket are aligned in a desired position.

4. The support of claim 3, wherein the ball has multiple detent areas and the detent area of the socket can engage each of the ball's detent areas, thereby allowing the support to be biased in multiple different desired positions.

5. The support of claim 1, wherein the detent area of the ball comprises an outward protrusion that extends around a circumference of the ball; and,
   the detent area of the socket comprises an indentation that extends around an internal circumference of the socket and is adapted to engage the outward protrusion of the ball when the ball and socket are aligned in a desired position.

6. The support of claim 5, wherein the socket has multiple detent areas and the ball detent area can engage each of the socket's detent areas, thereby allowing the support to be biased in multiple different desired positions.

7. A flexible multi-jointed support for holding items, including lamps and tools, wherein the support is comprised of multiple segments that are joined end to end each joining of two segments thereby forming the joints, and at least one of the joints is a ball and socket joint that is capable of being biased in a desired orientation, wherein each ball and socket joint comprises:
   a male portion, that is in the shape of a ball, wherein the ball comprises a detent area that includes one part of a detent mechanism; and,
   a spring biasing female portion, that is in the shape of a socket that frictionally embraces the ball, wherein the socket comprises a detent area that includes a second complimentary part of the detent mechanism that aligns with and engages the detent area of the ball when the male and female portions are placed in a desired position thereby biasing the joint toward that position;

wherein the detent area of the ball comprises a spring band and one or more ball bearings aligned around an outside of the spring band, wherein the spring band provides an outward force on the one or more ball bearing; and, the detent area of the socket comprises an indentation that extends around an internal circumference of the socket, wherein the indentation is adapted to engage the one or more ball bearings when the ball and socket are aligned in a desired position.

8. The support of claim 7, wherein the ball has one detent area and the socket has multiple detent areas, wherein the detent area of the ball may engage more than one of the socket's detent areas, thereby allowing the support to be biased in multiple different desired positions.

9. The support of claim 7, wherein the socket has one detent area and the ball has multiple detent areas, wherein the detent area of the socket may engage more than one of the ball's detent areas, thereby allowing the support to be biased in multiple different desired positions.

10. A flexible multi-jointed support for holding items, including lamps and tools, wherein the support is comprised of multiple segments that are joined end to end each joining of two segments thereby forming the joints, and at least one of the joints is a ball and socket joint that is capable of being biased in a desired orientation, wherein each ball and socket joint comprises:

a male portion, that is in the shape of a ball, wherein the ball comprises a detent area that includes one part of a detent mechanism; and, a spring biasing female portion, that is in the shape of a socket that frictionally embraces the ball, wherein the socket comprises a detent area that includes a second complimentary part of the detent mechanism that aligns with and engages the detent area of the ball when the male and female portions are placed in a desired position thereby biasing the joint toward that position;

wherein the detent area of the ball comprises an indentation that extends around a circumference of the ball; and, the detent area of the socket comprises a spring band that extends around an external circumference of the socket and provides an inward force on one or more ball bearing, wherein the ball bearings are aligned along an interior of the spring band and adapted to engage the indentation in the ball when the ball and socket are aligned in a desired position.

11. The support of claim 10, wherein the ball has one detent area and the socket has multiple detent areas, wherein the detent area of the ball may engage more than one of the socket's detent areas, thereby allowing the support to be biased in multiple different desired positions.

12. The support of claim 10, wherein the socket has one detent area and the ball has multiple detent areas, wherein the detent area of the socket may engage more than one of the ball's detent areas, thereby allowing the support to be biased in multiple different desired positions.

13. A flexible multi-jointed support for holding items, including lamps and tools, wherein the support is comprised of multiple segments that are joined end to end each joining of two segments thereby forming the joints, and at least one of the joints is a ball and socket joint that is capable of being biased in a desired orientation, wherein the at least one ball and socket joint comprises:

a male portion, that is in the shape of a ball, wherein the ball has one or more detent areas; and, a spring biasing female portion, that is in the shape of a socket that frictionally embraces the ball, wherein the socket has one or more detent areas, and, each socket detent area can engage at least one of the ball's detent areas and each ball detent area can engage at least one of the socket's detent areas, thereby allowing the support to be biased in multiple different desired positions, and further wherein each segment is hollow and each ball has a hole at an axial end so that a cord, such as a power cord, can pass through an interior of the support.

* * * * *